United States Patent
Lidzborski et al.

(10) Patent No.: US 11,893,108 B2
(45) Date of Patent: *Feb. 6, 2024

(54) MUTUALLY DISTRUSTING ENCLAVES

(71) Applicant: Google LLC, Mountain View, CA (US)

(72) Inventors: Nicolas Lidzborski, Belmont, CA (US); Jonathon Giffin, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/149,082

(22) Filed: Dec. 31, 2022

(65) Prior Publication Data

US 2023/0143188 A1 May 11, 2023

Related U.S. Application Data (63) Continuation of application No. 17/046,039, filed as application No. PCT/US2018/027161 on Apr. 11, 2018, now Pat. No. 11,544,372.

(51) Int. Cl.
*G06F 21/53* (2013.01)
*G06F 9/54* (2006.01)
(Continued)

(52) U.S. Cl.
CPC .............. *G06F 21/53* (2013.01); *G06F 9/547* (2013.01); *H04L 9/0618* (2013.01); *H04L 9/083* (2013.01);
(Continued)

(58) Field of Classification Search
CPC .... G06F 21/53; G06F 2221/031; G06F 9/547; H04L 63/029; H04L 63/0442; H04L 9/0618; H04L 9/083; H04L 9/0894
See application file for complete search history.

(56) References Cited

U.S. PATENT DOCUMENTS 9,983,894 B2 * 5/2018 Horovitz ............. G06F 9/45545
10,311,217 B2 * 6/2019 Miller ..................... G06F 21/53
(Continued)

FOREIGN PATENT DOCUMENTS

| CN | 105531709 A | 4/2016 |
| CN | 107111715 A | 8/2017 |

(Continued)

OTHER PUBLICATIONS

International Search Report for the related Application No. PCT/US2018/027161, dated Apr. 11, 2018, 12 pages.
(Continued)

*Primary Examiner* — Sharon S Lynch
(74) *Attorney, Agent, or Firm* — Honigman LLP; Brett A. Krueger (57) ABSTRACT

A method for accessing one or more service processes of service includes executing at least one service enclave and executing an enclave sandbox that wraps the at least one service enclave. The at least one service enclave provides an interface to the one or more service processes. The enclave sandbox is configured to establish an encrypted communication tunnel to the at least one service enclave interfacing with the one or more service processes, and communicate program calls to/from the one or more service processes as encrypted communications through the encrypted communication tunnel.

20 Claims, 7 Drawing Sheets

(51) Int. Cl.
  *H04L 9/06* (2006.01)
  *H04L 9/08* (2006.01)
  *H04L 9/40* (2022.01)

(52) U.S. Cl.
  CPC .......... *H04L 9/0894* (2013.01); *H04L 63/029* (2013.01); *H04L 63/0442* (2013.01); *G06F 2221/031* (2013.01)

(56) References Cited

U.S. PATENT DOCUMENTS

| | | | | |
|---|---|---|---|---|
| 10,389,524 | B2* | 8/2019 | Karagiannis | H04L 9/0822 |
| 10,417,428 | B2* | 9/2019 | Rajcan | H04W 12/06 |
| 10,528,722 | B2* | 1/2020 | Gray | H04L 9/3247 |
| 10,637,645 | B2* | 4/2020 | Gray | G06F 21/53 |
| 10,664,591 | B2* | 5/2020 | Gray | G06F 21/53 |
| 10,740,455 | B2* | 8/2020 | Gray | H04L 9/0891 |
| 10,747,905 | B2* | 8/2020 | Gray | G06F 21/602 |
| 10,776,459 | B2* | 9/2020 | Bojjireddy | G06F 9/455 |
| 10,833,858 | B2* | 11/2020 | Gray | H04L 9/3236 |
| 10,911,451 | B2* | 2/2021 | Costa | G06F 21/645 |
| 10,931,652 | B2* | 2/2021 | Costa | G06F 21/6209 |
| 10,977,384 | B2* | 4/2021 | Benaloh | G06F 21/6245 |
| 11,016,949 | B2* | 5/2021 | Vaswani | G06F 16/2455 |
| 2012/0159184 | A1 | 6/2012 | Johnson et al. | |
| 2013/0067245 | A1* | 3/2013 | Horovitz | G06F 21/57 |
| | | | | 713/193 |
| 2013/0232344 | A1* | 9/2013 | Johnson | G06F 21/53 |
| | | | | 713/193 |
| 2014/0282935 | A1* | 9/2014 | Lal | G06F 21/72 |
| | | | | 726/6 |
| 2015/0089502 | A1* | 3/2015 | Horovitz | G06F 9/45558 |
| | | | | 718/1 |
| 2016/0171248 | A1* | 6/2016 | Nesher | G06F 21/53 |
| | | | | 713/190 |
| 2016/0205074 | A1* | 7/2016 | Mitchell | H04L 63/0823 |
| | | | | 713/171 |
| 2016/0350761 | A1* | 12/2016 | Raziel | G06Q 20/40145 |
| 2017/0039368 | A1 | 2/2017 | Grobman et al. | |
| 2017/0169227 | A1* | 6/2017 | Rajcan | G06F 9/4416 |
| 2017/0353319 | A1 | 12/2017 | Scarlata et al. | |
| 2018/0165428 | A1* | 6/2018 | Miller | G06F 8/51 |
| 2018/0183578 | A1* | 6/2018 | Chakrabarti | H04L 9/0861 |
| 2018/0183580 | A1* | 6/2018 | Scarlata | G06F 21/53 |
| 2018/0189482 | A1* | 7/2018 | Nesher | G06F 21/53 |
| 2018/0211034 | A1* | 7/2018 | Costa | G06F 9/45558 |
| 2018/0211035 | A1* | 7/2018 | Costa | G06F 21/64 |
| 2018/0212770 | A1* | 7/2018 | Costa | H04L 63/0428 |
| 2018/0212939 | A1* | 7/2018 | Costa | G06F 12/1408 |
| 2018/0212966 | A1* | 7/2018 | Costa | H04L 63/10 |
| 2018/0330077 | A1* | 11/2018 | Gray | H04L 9/3236 |
| 2018/0330078 | A1* | 11/2018 | Gray | G06F 21/53 |
| 2018/0330079 | A1* | 11/2018 | Gray | H04L 9/0894 |
| 2018/0330125 | A1* | 11/2018 | Gray | H04L 9/3221 |
| 2018/0332011 | A1* | 11/2018 | Gray | H04L 9/0841 |
| 2018/0341774 | A1* | 11/2018 | Yao | G06F 21/44 |
| 2018/0375644 | A1* | 12/2018 | Karagiannis | H04L 63/0281 |
| 2019/0065406 | A1* | 2/2019 | Steiner | H04L 9/3271 |
| 2019/0147188 | A1* | 5/2019 | Benaloh | G06F 21/602 |
| | | | | 726/26 |
| 2019/0180006 | A1* | 6/2019 | Bojjireddy | G06F 9/455 |
| 2019/0197242 | A9* | 6/2019 | Rajcan | G06F 9/4416 |

FOREIGN PATENT DOCUMENTS

| | | |
|---|---|---|
| EP | 3235161 A2 | 10/2017 |
| WO | 2012082410 A2 | 6/2012 |
| WO | 2015047442 A1 | 4/2015 |
| WO | 2016122751 A2 | 8/2016 |
| WO | 2017210145 A1 | 12/2017 |

OTHER PUBLICATIONS

USPTO. Office Action relating to U.S. Appl. No. 17/046,039, dated Jun. 17, 2022.
Search Query Report from IP.com <http://IP.com> (performed Aug. 26, 2022) (Year: 2022).
Defense in Depth, A practical strategy for achieving Information Assurance in today's highly networked environments, by National Security Agency (Mar. 12, 2010) (Year: 2010).

* cited by examiner

MUTUALLY DISTRUSTING ENCLAVES

CROSS REFERENCE TO RELATED APPLICATIONS

This U.S. patent application is a continuation of, and claims priority under 35 U.S.C. § 120 from, U.S. patent application Ser. No. 17/046,039, filed on Oct. 8, 2020, which claims priority under 35 U.S.C. § 371 from PCT/US2018/027161, filed on Apr. 11, 2018. The disclosures of these prior applications are considered part of the disclosure of this application and are hereby incorporated by reference in their entireties.

TECHNICAL FIELD

This disclosure relates to mutually distrusting enclaves.

BACKGROUND

Service processes executing in a cloud environment handle client stored data such as authentication credentials, confidential documents, or other sensitive data the client wants to keep secret. In addition to keeping client data safe from exposure and disclosure to unwanted external parties, clients further require an increased assurance that their data stored in the cloud environment and manipulated by service processes remains confidential from operators/administrators of the service processes. As such, providing safeguards that prevent access to customer stored data from malicious actors—even when those attacks originate from privileged software, increases customer confidence by alleviating the risk of security breaches that expose client data to unwanted parties.

SUMMARY

One aspect of the disclosure provides method for accessing one or more service processes of service. The method includes executing, by data processing hardware, at least one service enclave, the at least one service enclave providing an interface to the one or more service processes, and executing, by the data processing hardware, an enclave sandbox that wraps the at least one service enclave. The enclave sandbox is configured to: establish an encrypted communication tunnel to the at least one service enclave interfacing with the one or more service processes, and communicate program calls to/from the one or more service processes as encrypted communications through the encrypted communication tunnel.

Implementations of the disclosure may include one or more of the following optional features. In some implementations, the method further includes receiving, at the data processing hardware, a program call to the one or more service processes, the program call including cleartext. In these implementations, the method also includes encrypting, by the data processing hardware, the cleartext as ciphertext using an encryption key, and communicating, by the data processing hardware, the ciphertext though the encrypted communication tunnel to the one or more service processes. The at least one service enclave may be configured to obtain a decryption key from a key manager for decrypting the ciphertext back to cleartext after success attestation to the key manager. In some examples, after encrypting the cleartext as ciphertext at the sandbox enclave, the method also includes storing, by the data processing hardware, the encryption key in the key manager. Here, the encryption key is associated with the decryption key obtained by the at least one service enclave for decrypting the ciphertext back to cleartext. Moreover, the receiving of the program call to the one or more services may include receiving one of a get data call or a put data call from a client process interfacing with the enclave sandbox. The client process may execute on a client device in communication with the data processing hardware over a network.

In some examples, the method also includes receiving, at the data processing hardware, a program call from the one or more service processes interfacing with the at least one service enclave through the encrypted communication tunnel. The program call includes ciphertext. Thereafter, in these examples, the method also includes obtaining, by the data processing hardware, a decryption key from a key manager for decrypting the ciphertext to cleartext after success attestation to the key manager, and communicating, by the data processing hardware, the cleartext to a client process interfacing with the enclave sandbox. The client process may execute on a client device in communication with the data processing hardware over a network. In these examples, the at least one service enclave may be configured to receive the program call from the one or more service processes through the interface, wherein the program call includes cleartext. Thereafter, the service enclave may be configured to encrypt the cleartext into ciphertext using an encryption key and communicate the ciphertext through the encrypted communication tunnel to the enclave sandbox. The receiving of the program call from the one or more service processes may include receiving a return data call from the one or more service processes, the return call including a data object requested by the client process.

The encrypted communication tunnel may extend through the enclave sandbox between an input end at the interface to the one or more service processes and an output end at the enclave sandbox interfacing with a client process. The program call communicated to/from the one or more service processes by the enclave sandbox include remote procedure calls. The at least one service enclave is unavailable for remote attestation by a client process interfacing with the sandbox enclave.

Another aspect of the disclosure provides a method for accessing a service process. The method includes, executing, by data processing hardware, an inner enclave that interfaces with the service process of a software application, executing, by the data processing hardware, an outer enclave that wraps the inner enclave, and establishing, by the data processing hardware, an encryption communication tunnel through the outer enclave to the inner enclave interfacing with the service process. The encryption communication tunnel extends from a first interface between the outer enclave and an external network to a second interface between the inner enclave and the service process. The method also includes communicating, by the data processing hardware, program calls to/from the service process as encrypted communications through the encrypted communication tunnel.

This aspect may include one or more of the following optional features. In some implementations, the method also includes receiving, at the data processing hardware, a program call to the service process, the program call including cleartext issued by a client process interfacing with the outer enclave through the external network. In these implementations, the method also includes encrypting, by the data processing hardware, the cleartext as ciphertext using an encryption key, and communicating, by the data processing hardware, the ciphertext though the encrypted communication tunnel to the service process. Here, the inner enclave may be configured to obtain a decryption key from a key manager for decrypting the ciphertext back to cleartext after success attestation to the key manager.

In some examples, the method also includes receiving, at the data processing hardware, a program call from the inner enclave through the encrypted communication tunnel, the program call including ciphertext; obtaining, by the data processing hardware, a decryption key from a key manager for decrypting the ciphertext to cleartext after success attestation to the key manager; and communicating, by the data processing hardware, the cleartext to a client process interfacing with the enclave sandbox through the external network. In these examples, the inner enclave may be configured to receive the program call issued by the service process, the program call including cleartext; encrypt the cleartext into the ciphertext using an encryption key; and communicate the ciphertext though the encrypted communication tunnel to the outer enclave.

Another aspect of the disclosure provides system for accessing one or more service processes of service. The system includes data processing hardware and memory hardware in communication with the data processing hardware. The memory hardware storing instructions that when executed by the data processing hardware cause the data processing hardware to perform operations that include executing at least one service enclave, the at least one service enclave providing an interface to the one or more service processes, and executing an enclave sandbox that wraps the at least one service enclave. The enclave sandbox is configured to: establish an encrypted communication tunnel to the at least one service enclave interfacing with the one or more service processes, and communicate program calls to/from the one or more service processes as encrypted communications through the encrypted communication tunnel.

Implementations of the disclosure may include one or more of the following optional features. In some implementations, the operations further include receiving a program call to the one or more service processes, the program call including cleartext. In these implementations, the operations also include encrypting the cleartext as ciphertext using an encryption key, and communicating the ciphertext though the encrypted communication tunnel to the one or more service processes. The at least one service enclave may be configured to obtain a decryption key from a key manager for decrypting the ciphertext back to cleartext after success attestation to the key manager. In some examples, after encrypting the cleartext as ciphertext at the sandbox enclave, the operations also include storing the encryption key in the key manager. Here, the encryption key is associated with the decryption key obtained by the at least one service enclave for decrypting the ciphertext back to cleartext. Moreover, the receiving of the program call to the one or more services may include receiving one of a get data call or a put data call from a client process interfacing with the enclave sandbox. The client process may execute on a client device in communication with the data processing hardware over a network.

In some examples, the operations also include receiving a program call from the one or more service processes interfacing with the at least one service enclave through the encrypted communication tunnel. The program call includes ciphertext. Thereafter, in these examples, the operations also include obtaining a decryption key from a key manager for decrypting the ciphertext to cleartext after success attestation to the key manager, and communicating the cleartext to a client process interfacing with the enclave sandbox. The client process may execute on a client device in communication with the data processing hardware over a network. In these examples, the at least one service enclave may be configured to receive the program call from the one or more service processes through the interface, wherein the program call includes cleartext. Thereafter, the service enclave may be configured to encrypt the cleartext into ciphertext using an encryption key and communicate the ciphertext through the encrypted communication tunnel to the enclave sandbox. The receiving of the program call from the one or more service processes may include receiving a return data call from the one or more service processes, the return call including a data object requested by the client process.

The encrypted communication tunnel may extend through the enclave sandbox between an input end at the interface to the one or more service processes and an output end at the enclave sandbox interfacing with a client process. The program call communicated to/from the one or more service processes by the enclave sandbox include remote procedure calls. The at least one service enclave is unavailable for remote attestation by a client process interfacing with the sandbox enclave.

In yet another aspect of the present disclosure, a system for accessing a service process includes data processing hardware and memory hardware in communication with the data processing hardware. The memory hardware storing instructions that when executed by the data processing hardware cause the data processing hardware to perform operations that include receiving a program call to the service process, the program call including cleartext issued by a client process interfacing with the outer enclave through the external network. In these implementations, the operations also include encrypting the cleartext as ciphertext using an encryption key, and communicating the ciphertext though the encrypted communication tunnel to the service process. Here, the inner enclave may be configured to obtain a decryption key from a key manager for decrypting the ciphertext back to cleartext after success attestation to the key manager.

In some examples, the operations also include receiving a program call from the inner enclave through the encrypted communication tunnel, the program call including ciphertext; obtaining a decryption key from a key manager for decrypting the ciphertext to cleartext after success attestation to the key manager; and communicating the cleartext to a client process interfacing with the enclave sandbox through the external network. In these examples, the inner enclave may be configured to receive the program call issued by the service process, the program call including cleartext; encrypt the cleartext into the ciphertext using an encryption key; and communicate the ciphertext though the encrypted communication tunnel to the outer enclave.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Customers (e.g., clients) of a cloud service provider require assurance that their data stored in a cloud computing environment (i.e., distributed system), and used by software applications executing in the cloud computing environment, are kept secret from external parties (e.g., hackers), as well as from administrators or other personal of the cloud service provider. The software applications executing in the cloud computing environment may include productivity and collaboration services, such as email services, messaging services, calendar services, word processing services, spreadsheet services and/or storage services. A customer may access the services using a web-browser for initiating program calls to provide/request client sensitive data to/from the services. In turn, the services may use application programming interfaces (APIs) to initiate program calls that return client sensitive data to the customer.

Implementations herein are directed toward executing service enclaves to provide secure execution environments for service processes operating on customer cleartext data, and also executing an enclave sandbox configured to wrap one or more service enclaves and serve as a proxy for communicating customer data into and out of the one or more service enclaves. Thus, while each service enclave guarantees that customer cleartext data therein is protected and kept secret from outside parties, the enclave sandbox provides an increased level of assurance that the customer data entering/exiting the service enclaves remains confidential by performing all encryption/decryption operations on the customer data. For instance, in order to facilitate secure communication of program calls that include customer data to/from one or more service processes, the enclave sandbox is configured to provide an encryption communication tunnel (i.e., secure channel) for communicating the customer data to a service enclave interfacing with the one or more service processes. Here, the encryption communication tunnel may extend into the enclave sandbox between an input end at the service enclave interfacing with the one or more service processes and an output end at the enclave sandbox interfacing with a client process. The client process may execute on a client device associated with a client (e.g., customer) that owns customer data. The enclave sandbox may also be referred to as an outer enclave and the at least one enclave sandbox may also be referred to as an inner enclave.

In some examples, the enclave sandbox receives client cleartext data in a client-initiated program call to a service process, and encrypts the cleartext into ciphertext for communication through the encryption communication tunnel to the service process interfacing with the corresponding service enclave. At the input end of the encryption communication tunnel that interfaces with the service process, the service enclave may obtain a decryption key from a key manager to decrypt the ciphertext back to cleartext for execution by the service process within the secure execution environment of the service enclave. Here, the service enclave may be duly registered (authorized/authenticated) with the key manager to obtain cryptographic material (e.g., decryption key) for decrypting the ciphertext communicated through the encryption communication tunnel from the enclave sandbox. For instance, the enclave sandbox may store an encryption key with the key manager upon encrypting the cleartext data into ciphertext, and provide information that verifies that the service enclave receiving the ciphertext is legitimate. In order to obtain the appropriate decryption key, the service enclave must successfully attest to the key manager. At the same time, the enclave sandbox may duly register with the key service upon storing the encryption to verify the enclave sandbox as legitimate for decrypting the ciphertext back to cleartext at a later time.

In other examples, a service enclave receives a service process-initiated program call (e.g., a return data call) to a client process that includes client cleartext data, and encrypts the cleartext into ciphertext for communication through the encryption communication tunnel to the enclave sandbox interfacing with the client process. At the output end of the encryption communication tunnel, the enclave sandbox may obtain a decryption key from the key manager to decrypt the ciphertext back to cleartext before returning the cleartext back to the client process. Here, the enclave sandbox may obtain the decryption key from the key manager after successful attestation with the key manager. Accordingly, while the service enclaves guarantee that client cleartext data used by service processes therein remains safe and confidential from external parties, the enclave sandbox wrapping the service enclaves provides an additional layer of protection to keep client data entering/exiting the service enclaves safe and confidential even from administrators of the cloud service provider with high-credentials. In other words, the enclave sandbox serves as a proxy for the communication of program calls to/from service processes by enforcing a data exfiltration policy that requires both the enclave sandbox and the service enclave to duly register with the key manager in order to obtain cryptographic material (e.g., decryption keys) for decrypting client ciphertext data. Therefore, the enclave sandbox mandates the communication of client ciphertext data through the secure encryption communication tunnel and requires that the ciphertext can only be decrypted back into plaintext after successful attestation to the key manager. Thus, administrators of the cloud service provider, regardless of credentials, will be prevented from viewing or decrypting client-sensitive data because the administrators will not be able to attest as legitimate for obtaining/fetching the appropriate cryptographic material from the key manager.

Figure 1:
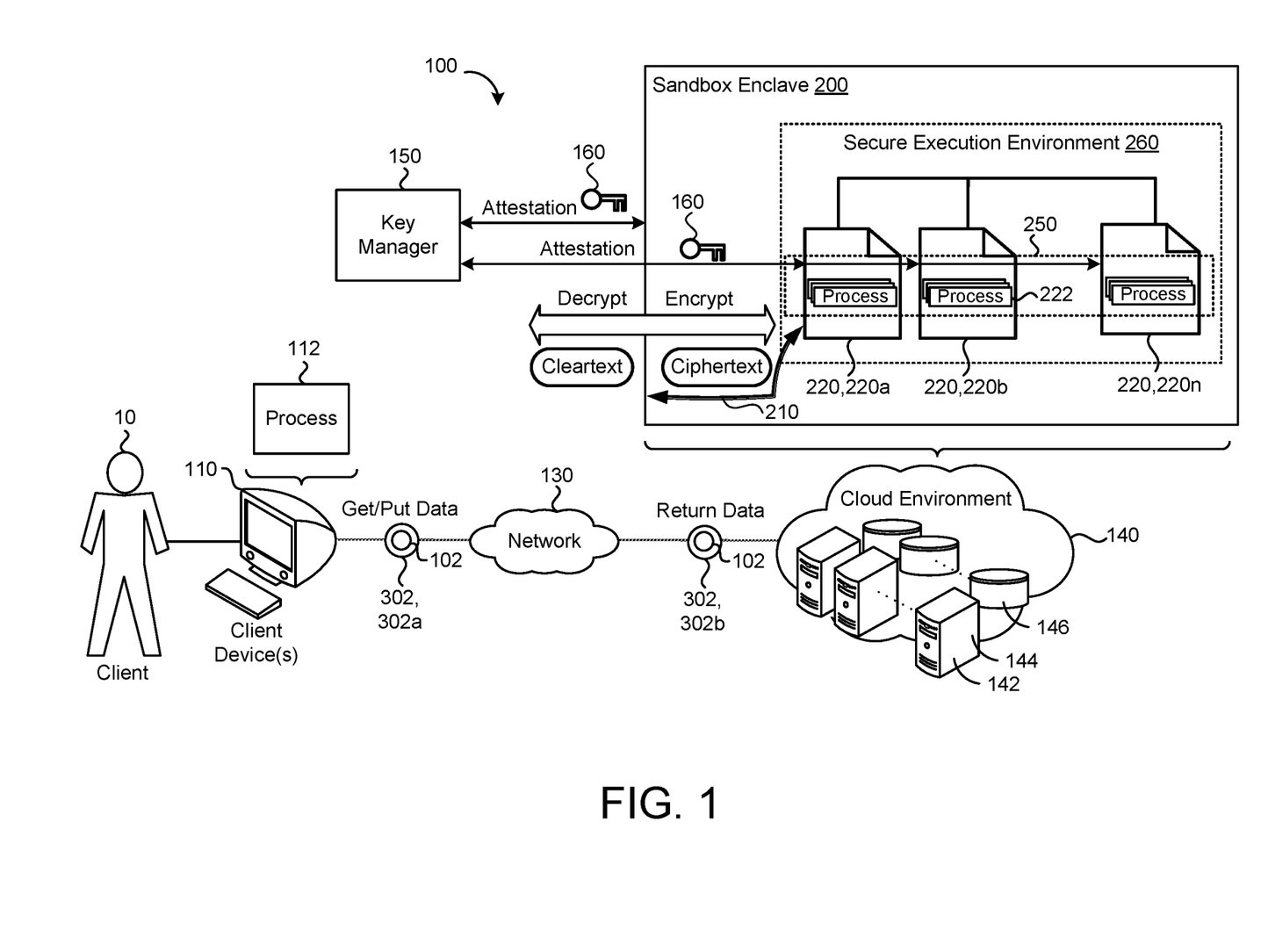
FIG. 1 is a schematic view of an example system including at least one service enclave interfacing with one or more service processes of a service and an enclave sandbox wrapping the at least one service enclave.

Referring to FIG. 1, in some implementations, a system 100 includes a client device 110 associated with a user/client 10, who may communicate, via network 130, with a remote system 140. For instance, the client device 110 may execute a client process 112 (e.g., a web-browser) to communicate with the remote system 140. The remote system 140 may be a distributed system (e.g., cloud computing environment) having scalable/elastic resources 142. The resources 142 include computing resources 144 (e.g., data processing hardware) and/or storage resources 146 (e.g. memory hardware). In some implementations, the remote system 140 executes a service 250 (e.g., software application) on at least one service enclave 220. In the example shown, the computing resources 144 execute multiple service enclaves 220, 220a-n each providing an interface to one or more service processes 222 associated with the service 250. The remote system 140 also executes an enclave sandbox 200 that wraps each of the service enclaves 220 to serve as a proxy for communicating program calls 302 between service processes 222 and the client process 112.

Each service enclave 220 provides a secure execution environment 260 for executing one or more service processes 222 of a service 250. The service enclave 220 may include computing resources, storage resources, and/or network resources used by the one or more processes 222 of the service 250. Each enclave may be firewalled from outside intrusion to perform guarantees that data 102 operated upon, or stored within, the service enclave 220 is kept secret and confidential. Thus, the one or more enclaves 220 may contain the computational logic of the service 250.

A cloud service provider may offer the service 250 to the client 10 (e.g., customer). The cloud service provider may own and operate the distributed system 140 or may lease/rent the necessary resources 142 from an owner of the distributed system 140 to provide the service 250. The service 250 may include a software application that causes a computing device (e.g., data processing hardware 144) to perform a task. Thus, the service 250 may correspond to any type or form of software, file, and/or executable code that may be installed, run, deployed, and/or otherwise implemented on the distributed system 140. Example services (e.g., software applications) include, but or not limited to, word processing applications, spreadsheet applications, messaging applications, web browser applications, media streaming applications, social networking applications, security applications, and gaming applications. The service enclaves 220 may refer to a computing environment which, during execution, at least partially isolates the service processes' 222 view of an underlying operating system and/or resources.

The client device 110 can be any computing devices capable of communicating with the remote system 140 through the network 130. The client device 110 includes, but is not limited to, desktop computing devices and mobile computing devices, such as laptops, tablets, smart phones, and wearable computing devices (e.g., headsets and/or watches). The client device 110 may correspond to the user/client 10 of the remote system 140 that uses the service 250 (e.g., software application) executing on the remote system 140 to perform tasks.

In the example shown, the client device 110 executes the client process 112 (e.g., via an application programming interface (API)) to initiate a program call 302, 302a to one or more service processes 222 as well as receive service process-initiated program calls 302, 302b from the one or more service processes 222. For instance, the client-initiated program call 302a may include a get data call (e.g., cleartext function) that requests one or more service processes 222 to obtain and return client data 102 stored on the distributed system 140 and/or used by the service 250. In turn, the service process-initiated program call 302b may include a return data call containing the return data 102 requested by the get data call 302a from the client process 112. For instance, the service 250 may correspond to a spreadsheet service and the client data 102 returned from the service processes 222 in the program call 302b may include a page of a spreadsheet that the client 10 may view on a web-browser associated with the client process 112. The enclave sandbox 200 interfaces with both the client process 112 and the service enclaves 220 hosting the service processes 222 in order to facilitate the communication of program calls 302, 302a, 302b between the client process 112 and the service processes 222 of the service 250.

The client-initiated program call 302a may similarly include a put data call (e.g., clear text function) that includes client data 102 for receipt by the one or more service processes 222. In this example, the put data call 302a may cause the one or more service processes 222 to perform operations on the client data 102. For instance, using the same example as above where the service 250 includes a spreadsheet service, the put data call 302a may include client data 102 for entry into a specified cell on the spreadsheet. In other examples, the client-initiated program call 302a includes a command call that commands the service 250 to perform an operation (e.g., delete/move operation) on client data 102.

The client process 112 provides/receives all program calls 302 to/from the distributed system 140 via the network 130 as cleartext. In some examples, a program call 302 is a remote procedure call (RPC). Additionally or alternatively, some program calls 302 may include a representational state transfer (REST) call.

In some implementations, the distributed system 140 (e.g., the data processing hardware 144) executes the enclave sandbox 200 that wraps at least one service enclave 220 to provide an extra level of protection to client data 102 communicated to/from the at least one service enclave 220. For instance, the enclave sandbox 200 may be configured to establish an encrypted communication tunnel 210 to the at least one service enclave 220 interfacing with the one or more service processes 222, and communicate program calls 302 to/from the one or more service processes 222 as encrypted communications through the encrypted communication tunnel 210. While the example of FIG. 1 shows the enclave sandbox 200 establishing an encrypted communication tunnel 210 to only the service enclave 220a, the enclave sandbox 200 may similarly establish encrypted communication tunnels 210 with the other service enclaves 220b-220n.

The enclave sandbox 200 may interface with the client process 112 to receive a program call 302a to the one or more service processes 222 interfacing with the service enclave 220a. The program call 302a includes cleartext upon arrival at the enclave sandbox 200. Thereafter, the enclave sandbox 200 is responsible to encrypting the cleartext into ciphertext for communication through the encryption communication tunnel 210 to the service processes 222 interfacing with the service enclave 220a.

The client 10 may verify and attest the enclave sandbox 200 as legitimate for performing encryption/decryption operations on the program calls 302 containing client data 102. For instance, the client data 102 may contain object credentials that associate the client 10 with the client data 102 and verifies/attests the enclave sandbox 200 as legitimate for handling cryptographic material for accessing the client data 102. Accordingly, the enclave sandbox 200 includes necessary credentials to register with a key manager 150 to store and/or obtain cryptographic keys 160 for encrypting/decrypting program calls 302 communicated to/from service processes 222 through the encrypted communication tunnel 210.

Moreover, since primitives of the service enclaves 220 interfacing with the one or more service processes 222 make the service enclaves 220 inaccessible by the client process 112 for remote attestation, the enclave sandbox 200 is configured to provide information to the key manager 150 that verifies that a service enclave 220 receiving ciphertext through the encrypted communication tunnel 210 is legitimate. Thus, the enclave sandbox 200 may ensure that service enclaves 220 interfacing with service processes 222 include necessary credential for registering with the key manager 150 to store and/or obtain cryptographic keys 160 for encrypting/decrypting program calls 302 communicated through the encrypted communication tunnel 210.

In the example shown, the ciphertext program call 302 communicated through the encryption communication tunnel 210 to the service processes 222 is decrypted back into cleartext by the service enclave 220a interfacing with the service processes 222. Since the service enclave 220a is registered with the key manager 150, the service enclave 220a may successfully attest to the key manager 150 as legitimate for obtaining a decryption key 160 for decrypting the ciphertext back to cleartext. Accordingly, the service processes 222 may use the cleartext to execute the program call 302a from the client process 112 within the service enclave 220a. As the service enclave 220a provides an opaque and secure execution environment 260 for the service 250, the cleartext client data 102 is kept secret and protected by low-level primitives against memory inspection, debugging, and execution manipulation.

In some implementations, the service enclave 220a (or other service enclave 220b-220n) receives a cleartext program call 302b from the one or more service processes 222, encrypts the cleartext into ciphertext, and communicates the ciphertext through the encrypted communication tunnel 210 to the enclave sandbox 200 interfacing with the client process 112. Upon receiving the ciphertext program call 302b through the encrypted communication tunnel 210, the enclave sandbox 200 may obtain a decryption key 160 from the key manager 150 for decrypting the ciphertext back to cleartext. For example, as the enclave sandbox 200 is registered with the key manager 150, the enclave sandbox may successfully attest to the key manager 150 as legitimate for obtaining the decryption key 160. Thereafter, the enclave sandbox 200 may communicate the cleartext to the client process 112 executing on the client device 110. Accordingly, enclave sandbox 200 enforces a data exfiltration policy on all program calls 302 to/from service processes 222 that requires the program calls 302 entering/exiting the service enclaves 220 to pass through the encrypted communication channel 210 as ciphertext. As such, only the enclave sandbox 200 and service enclaves 220 having necessary credentials may obtain decryption keys 160 from the key manager 150 for decrypting the ciphertext back into cleartext.

Figure 2:
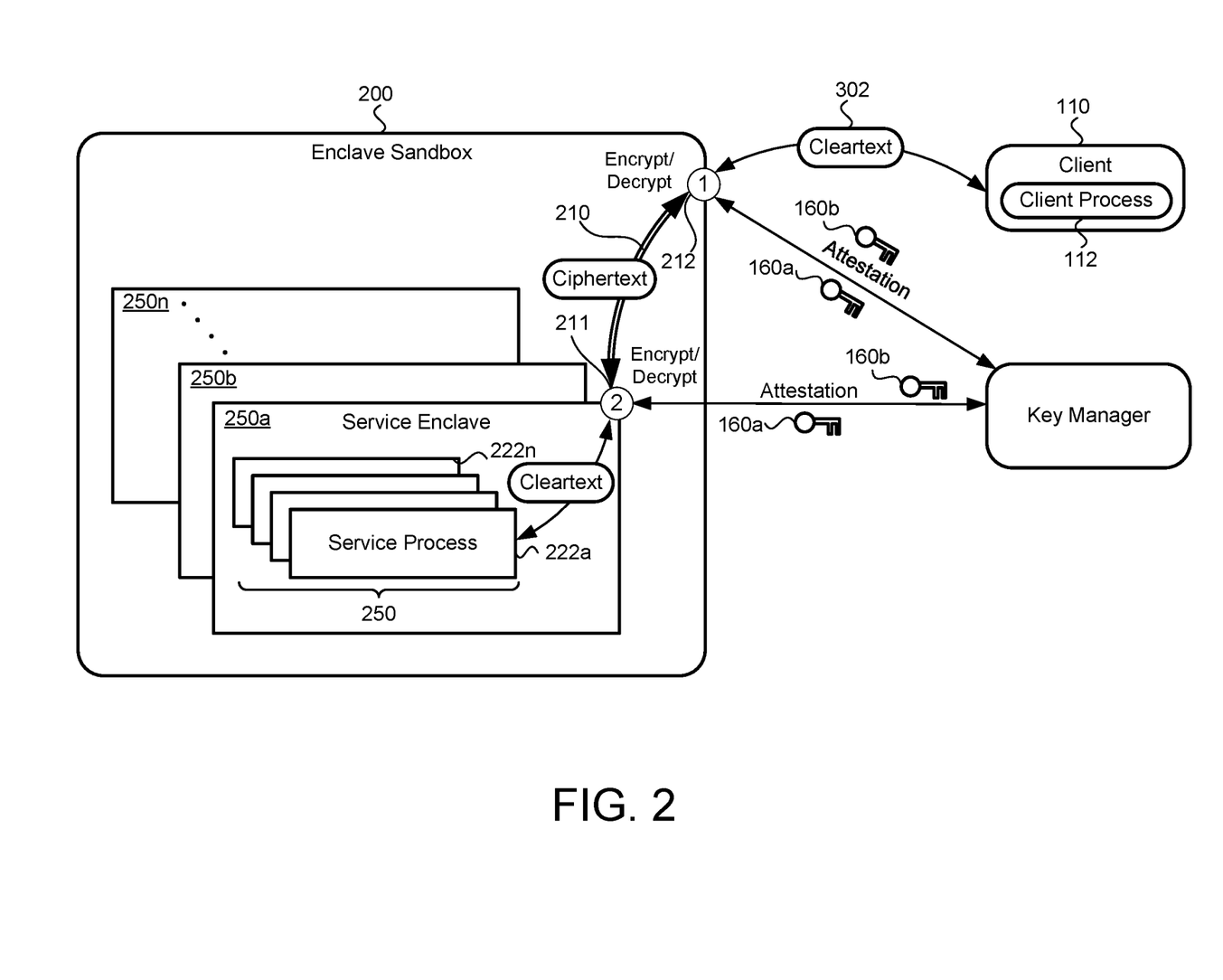
FIG. 2 is a schematic view of communication of program calls between service processes interfacing with a service enclave and a client process interfacing with an enclave sandbox wrapping the service enclave.

FIG. 2 shows an example enclave sandbox 200 interfacing with a client process 112 and wrapping multiple service enclaves 250a-250n. Each service enclave 250a-250b may provide an interface to one or more service processes 222. In the example shown, the service enclave 220a interfaces with multiple service processes 222, 222a-n associated with a service 250. By contrast to the service 250 of FIG. 1 executing across multiple service enclaves 220, the service 250 in the example of FIG. 2 executes within a single service enclave 220a.

When the client process 112 issues a program call 302 (e.g., a get/put data call) to service process 222a interfacing with service enclave 220a, the enclave sandbox 200 receives the program call 302 at interface "1" as cleartext. In some implementations, the enclave sandbox 200 encrypts the cleartext program call 302 into ciphertext using an encryption key 160a and establishes an encrypted communication channel 210 to the service enclave 220a interfacing with the intended recipient service process 222a. In the example shown, the encryption communication tunnel 210 extends into the enclave sandbox 200 between an input end 211 at the service enclave 220a interfacing (interface "2") with the service process 222a and an output end 212 at the enclave sandbox 200 interfacing (interface "1") with the client process 112. The enclave sandbox 200 may store the encryption key 160a in the key manager 150 after encrypting the cleartext into ciphertext. In some examples, the enclave sandbox 200 generates the encryption key 160a upon receipt of the program call 302 from the client process 112. In other examples, the enclave sandbox 200 receives the encryption key 160a from the client process 112. In yet other examples, the enclave sandbox 200 obtains the encryption key 160a from the key manager 150.

After the enclave sandbox 200 encrypts the cleartext into ciphertext and establishes the encryption communication tunnel 210, the enclave sandbox 200 communicates the program call 302 to the service process 222a as an encrypted communication (the ciphertext) through the encrypted communication tunnel 210. The program call 302 exiting the input end 211 of the encrypted communication tunnel 210 as ciphertext at interface "2" needs to be decrypted back to cleartext so that the service process 222a can perform the operation specified by the program call 302. For instance, when the program call 302 includes a get data call specifying client data 102 stored and used by the service 250, the service process 222a can perform an operation that retrieves and returns specified client data 102 back to the client process 112. In some implementations, the service enclave 220a is configured to obtain a decryption key 160b from the key manager 150 for decrypting the ciphertext back to cleartext at interface "2" after success attestation to the key manager 150. Accordingly, the service process 222a may now receive the cleartext program call 302, and the secure execution environment 270 (FIG. 1) provided by the service enclave 220a may keep the cleartext program call 302 secret and confidential from the outside.

When the service process 222a issues a program call 302 to client process 112 interfacing with the enclave sandbox 200, the service enclave 220a interfacing with the service process 222a receives the program call 302 at interface "2" as cleartext. For instance, the program call 302 may include a return data call including client data 102 specified in a get data call 302 previously issued by the client process 112. In some implementations, the enclave sandbox 200 encrypts the cleartext program call 302 into ciphertext using an encryption key 160a and communicates the ciphertext through the encrypted communication tunnel 210 to the enclave sandbox 200 at interface "1". The service enclave 220a may store the encryption key 160a in the key manager 150 after encrypting the cleartext into ciphertext. In some examples, the service enclave 220a generates the encryption key 160a upon receipt of the program call 302 from the service process 222a. In other examples, the service enclave 220a obtains the key 160a from the key manager 150.

Upon receiving the ciphertext program call 302 exiting the output end 212 of the encryption communication tunnel 210, the enclave sandbox 200 may obtain a decryption key 160b from the key manager 150 for decrypting the ciphertext to cleartext at interface "1" after success attestation to the key manager 150. Once the cleartext is decrypted, the enclave sandbox 200 may communicate the cleartext program call to the client process 112 executing on the client device 110. The client device 110 may be in communication with the enclave sandbox 200 via the network 130 (FIG. 1).

Figure 3A:
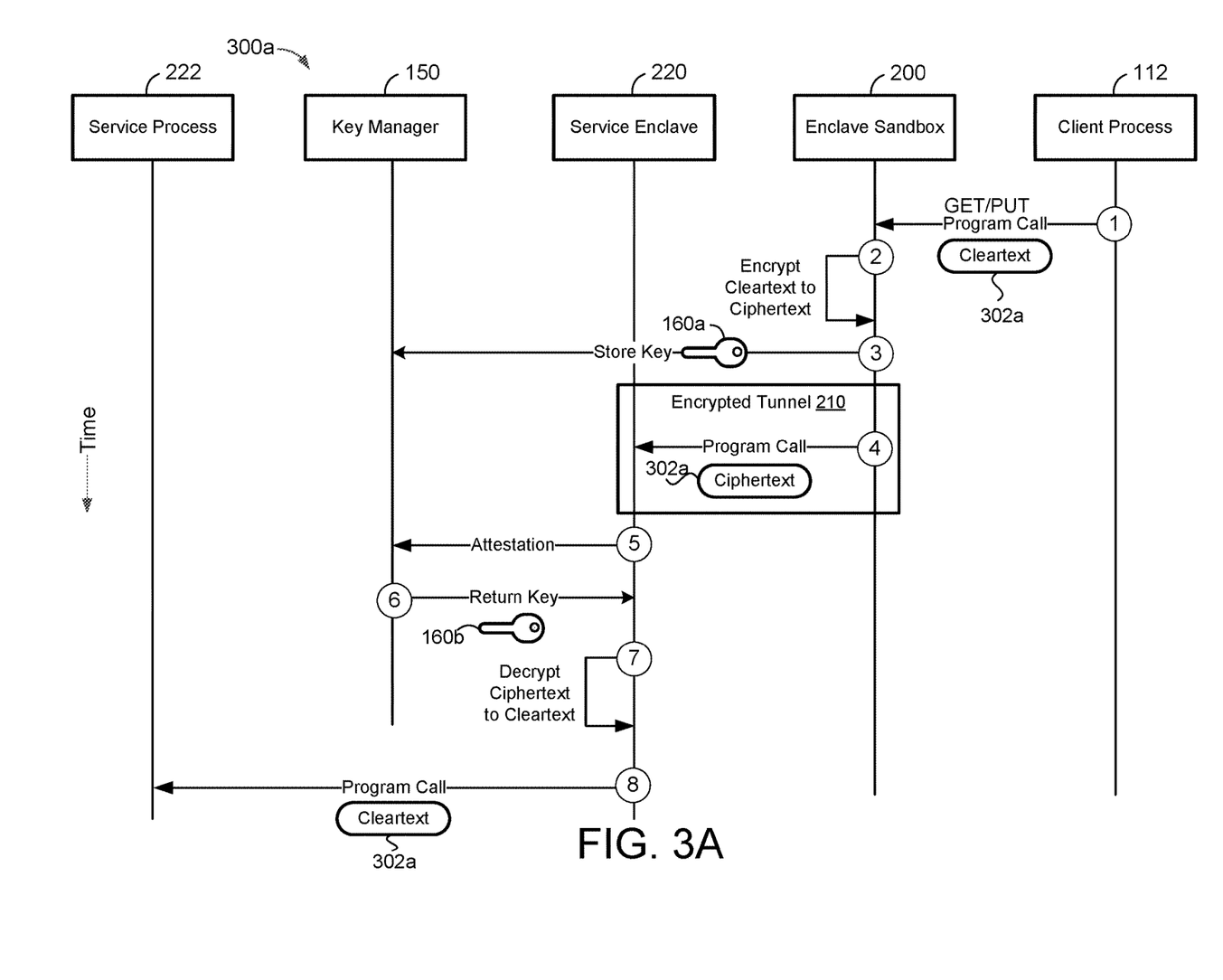
FIGS. 3A and 3B show schematic views of example operations performed by the enclave sandbox and the at least one service enclave of the system of FIG. 1.
Figure 3B:
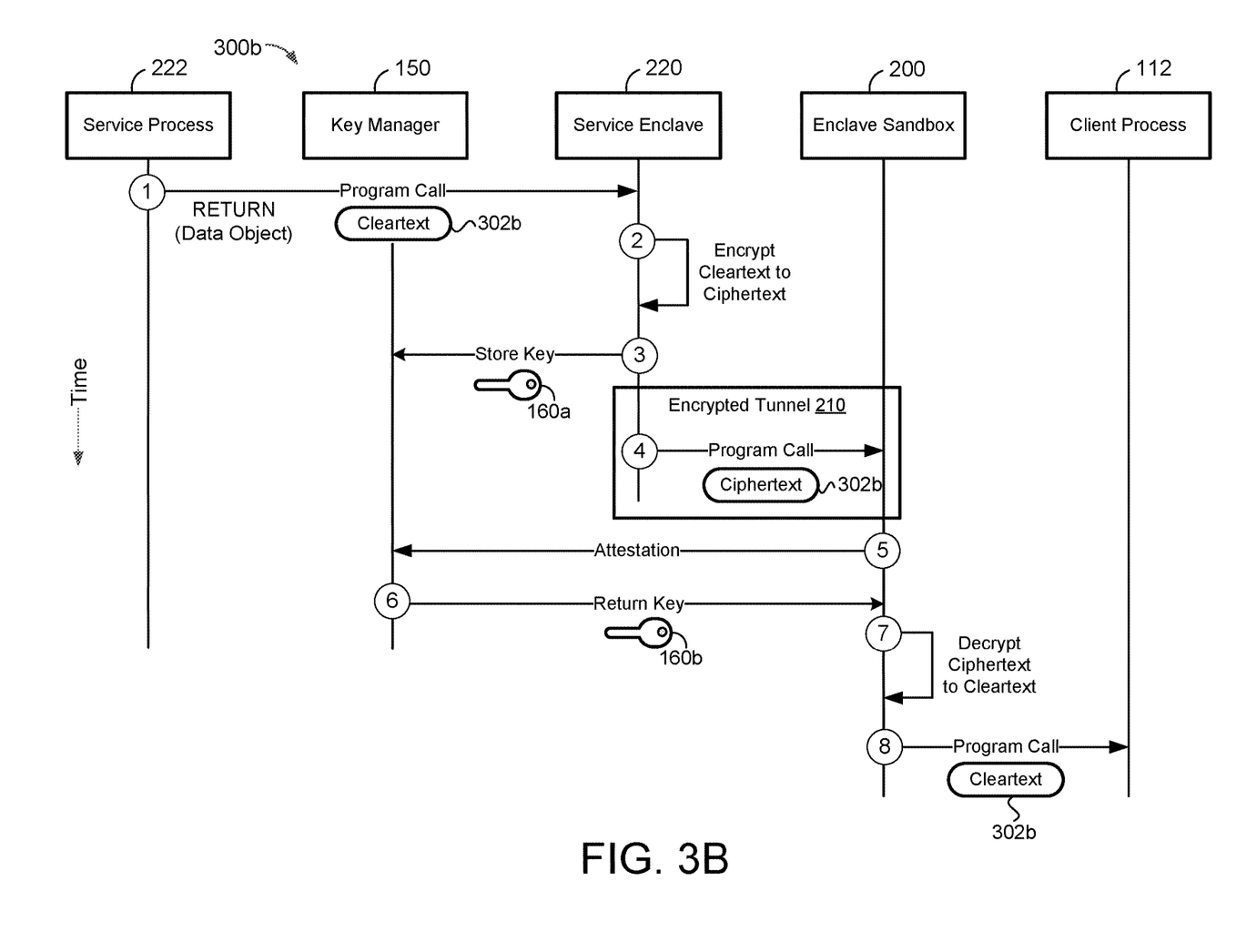

FIGS. 3A and 3B provide diagrams 300a, 300b illustrating example operations performed by the enclave sandbox 200 and the at least one service enclave 220 interfacing with a service process 222 of the distributed system 140. The diagrams 300a, 300b may be described with reference to the system 100 of FIG. 1 and the enclave sandbox 200 of FIG. 2. The vertical y-axis indicates time increasing from the top to the bottom.

FIG. 3A shows the enclave sandbox 200 receiving a program call 302, 302a to the service process 222 from the client process. For instance, the program call 302a may include a get data call, a pull data call, or another program call 302a such as a command to move or delete client data 102 stored on the distributed system 140 and used by the service process 222. At time 1, the client process 112 issues the program call 302a including cleartext over the network 130 to the enclave sandbox 200, and at time 2, the enclave sandbox 200 encrypts the cleartext into ciphertext. The enclave sandbox 200 may use an encryption key 160a to encrypt the cleartext into ciphertext and store the encryption key 160a at the key manager 150 at time 3. Concurrently or simultaneously with encrypting the cleartext into ciphertext, the enclave sandbox 200 may establish the encrypted communication tunnel 210 (or simply 'encrypted tunnel') to the service enclave 220 interfacing with the service process 222.

At time 4, the enclave sandbox 200 communicates the program call 302a to the service process 222 as an encrypted communication (ciphertext) through the encrypted communication tunnel 210. At time 5, the service enclave 220 performs attestation to the key manager 150 for requesting a decryption key 160b to decrypt the ciphertext program call 302a communicated through the encrypted communication tunnel 210 from the enclave sandbox 200. Successful attestation occurs when the service enclave 220 has the proper credentials that verify the service enclave 220 as legitimate and registered with the key manager 150. At time 6, the key manager 150 returns the decryption key 160b to the service enclave 220 after successful attestation to the key manager 150. If attestation is unsuccessful, then the key manager 150 will not provide the decryption key 160b to the service enclave 220. At time 7, the service enclave 220 uses the returned decryption key 160b to decrypt the ciphertext back to cleartext, and at time 8, provides the cleartext program call 302a to the service process 222 executing in the secure execution environment provided by the service enclave 220.

FIG. 3B shows the enclave sandbox 200 receiving a program call 302b to the client process 112 from the service process 222. For instance, the program call 302b may include a return data call including a data object (e.g., client data 102). At time 1, the service process 222 issues the program call 302b including cleartext, and at time 2, the service enclave 220 encrypts the cleartext into ciphertext. The service enclave 220 may use an encryption key 160a to encrypt the cleartext into ciphertext and store the encryption key 160a at the key manager 150 at time 3.

At time 4, the service enclave 220 communicates the program call 302b to the enclave sandbox 200 as an encrypted communication (ciphertext) through the encrypted communication tunnel 210. At time 5, the enclave sandbox 200 performs attestation to the key manager 150 for requesting a decryption key 160b to decrypt the ciphertext program call 302b communicated through the encrypted communication tunnel 210 from the service enclave 220. Successful attestation occurs when the enclave sandbox 200 has the proper credentials that verify the service enclave 220 as legitimate and registered with the key manager 150. If attestation is unsuccessful, then the key manager 150 will not provide the decryption key 160b to the enclave sandbox 200. Thus, in this scenario, the enclave sandbox 200 is not verified as legitimate by a client 10 who owns the data 102 in the program call. Accordingly, the program call 302b will not be viewable because the enclave sandbox 200 is unable to obtain the decryption key 160b needed to decrypt the ciphertext.

At time 6, the key manager 150 returns the decryption key 160b to the enclave sandbox 200 after successful attestation to the key manager 150, and at time 7, the enclave sandbox 200 uses the returned decryption key 160b to decrypt the ciphertext to cleartext. At time 8, the enclave sandbox 200 provides the cleartext program call 302b to the client process 112 over the network 130.

Figure 4:
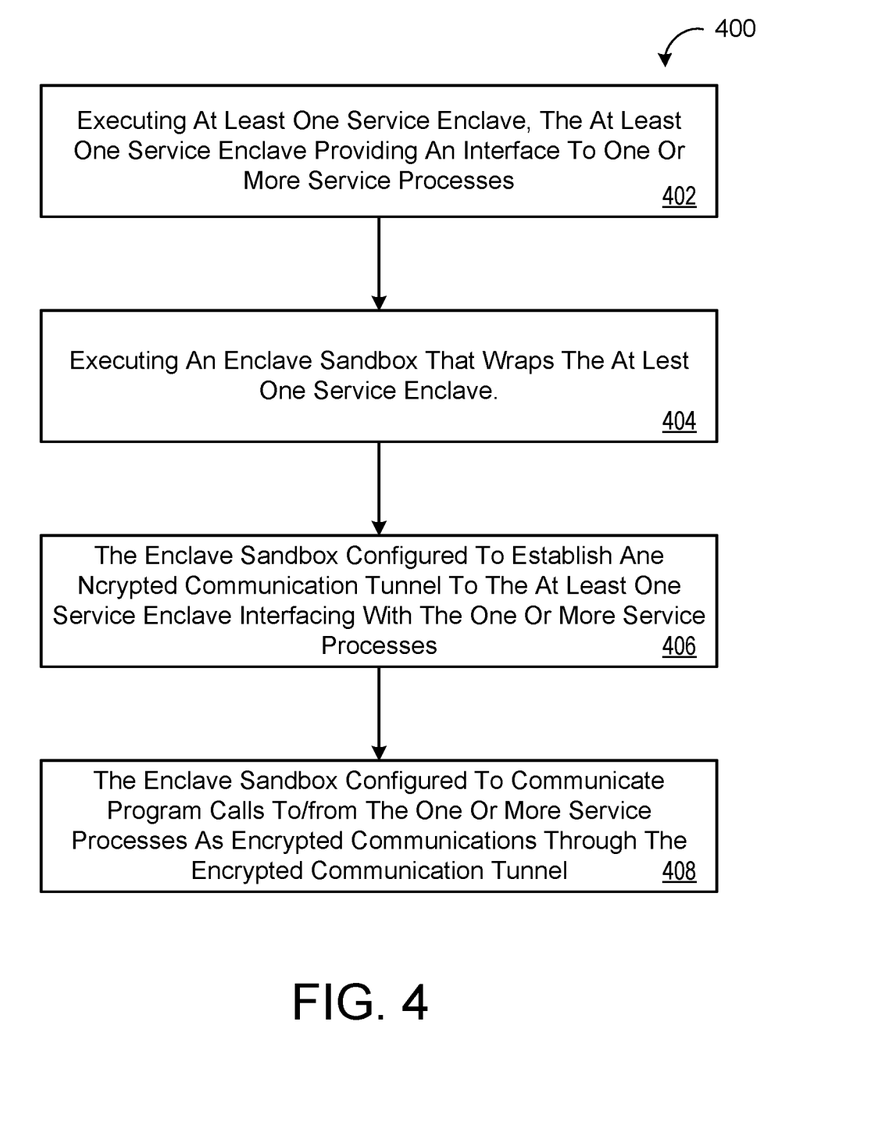
FIG. 4 is a flow chart of an example arrangement of operations for a method of accessing one or more service processes.

FIG. 4 is a flow chart of an example arrangement of operations for a method 400 of accessing a service process 222. The data processing hardware 144 may execute the operations for the method 400 by executing instructions stored on the memory hardware 146. The data processing hardware 144 may include one or more of the computing resources 142 executing on the distributed system 140. At operation 402, the method 400 includes executing, by data processing hardware 144, at least one service enclave 220 providing an interface to one or more service processes 222. The one or more service processes 222 may be associated with a service 250 (e.g., software application) running on the at least one service enclave 220. The at least one service enclave 220 provides a secure execution environment 260 for the one or more service processes 222 executing therein.

At operation 404, the method 400 includes executing, by the data processing hardware 144, an enclave sandbox 200 that wraps the at least one service enclave 220. At operation 406, the enclave sandbox 200 is configured to establish an encrypted communication tunnel 210 to the at least one service enclave 220 interfacing with the one or more service processes 222. The encrypted communication tunnel 210 may extend through the enclave sandbox 200 between an input end 211 at the interface to the one or more service processes 222 and an output end 212 at the enclave sandbox 200 interfacing with a client process 112. The client process 112 may execute on a client device 110 in communication with the data processing hardware 144 through a network 130.

At operation 408, the enclave sandbox 200 is configured to communicate program calls 302 to/from the one or more service processes 222 as encrypted communications through the encrypted communication tunnel 210. For instance, the enclave sandbox 200 may receive a program call 302a to the one or more service processes 222 from the client process 112. The program call 302a received from the client process 112 may include cleartext and the enclave sandbox 200 may encrypt the cleartext as ciphertext using an encryption key 160a and communicate the ciphertext through the encrypted communication tunnel 210 to the one or more service processes 222. In some examples, the at least one service enclave 220 is configured to obtain a decryption key 160b from a key manager 150 for decrypting the ciphertext back to cleartext after success attestation to the key manager 150.

Figure 5:
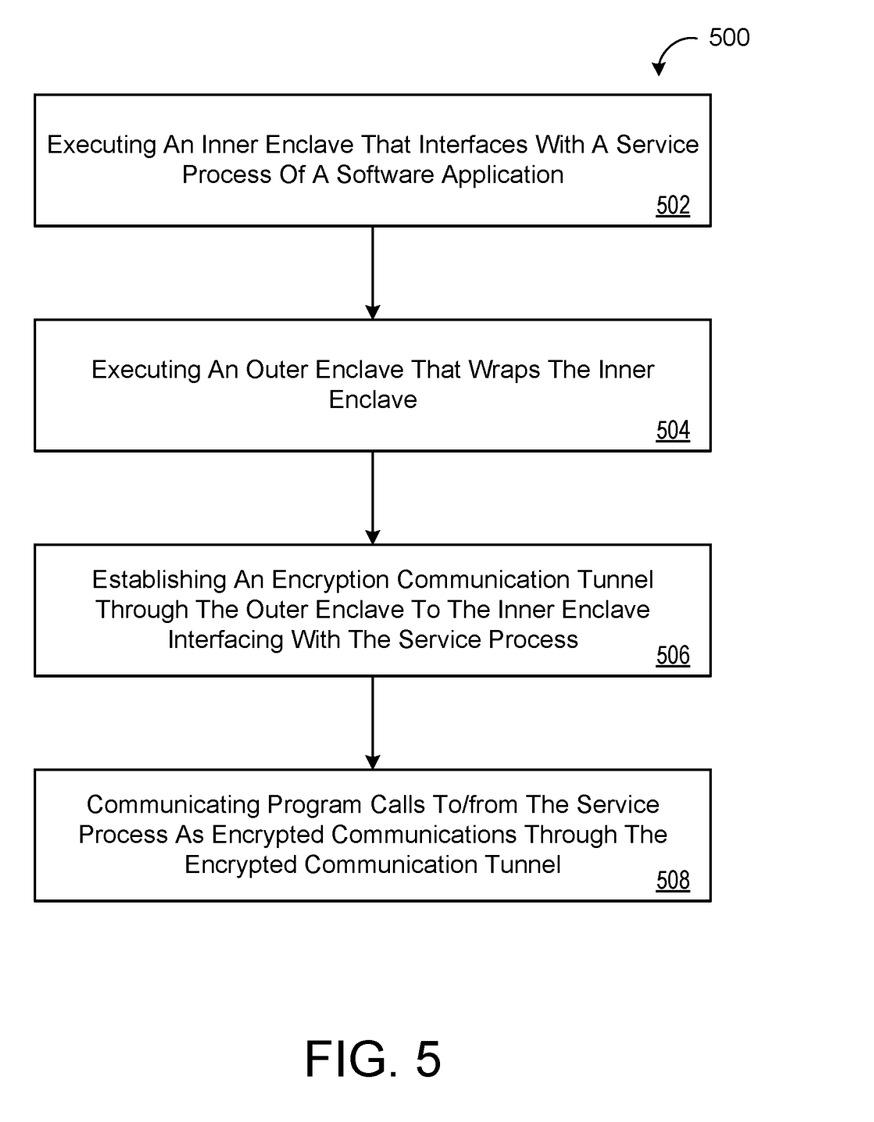
FIG. 5 is a flow chart of an example arrangement of operations for a method of accessing a service process.

FIG. 5 is a flow chart of an example arrangement of operations for a method 500 of accessing a service process 222. The data processing hardware 144 may execute the operations for the method 400 by executing instructions stored on the memory hardware 146. The data processing hardware 144 may include one or more of the computing resources 142 executing on the distributed system 140. At operation 502, the method 500 includes executing, by the data processing hardware 144, an inner enclave 220 that interfaces with a service process 222 of a software application 250 (e.g., a service). The inner enclave 220 may also be referred to as a service enclave 220. At operation 504, the method 500 includes executing, by the data processing hardware 144, an outer enclave 200 that wraps the inner enclave 220. The outer enclave 200 may also be referred to as an enclave sandbox 200.

At operation 506, the method 500 includes establishing, by the data processing hardware 144, an encryption communication tunnel 210 through the outer enclave 200 to the inner enclave 220 interfacing with the service process 222. The encryption communication tunnel 210 may extend from a first interface "1" (e.g., output end 212) between the outer enclave 200 and an external network 130 to a second interface "2" (e.g., input end 211) between the inner enclave 220 and the service process 222. At operation 508, the method 500 includes communicating, by the data processing hardware 144, program calls 302 to/from the service process 222 as encrypted communication through the encrypted communication tunnel 210.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

Figure 6:
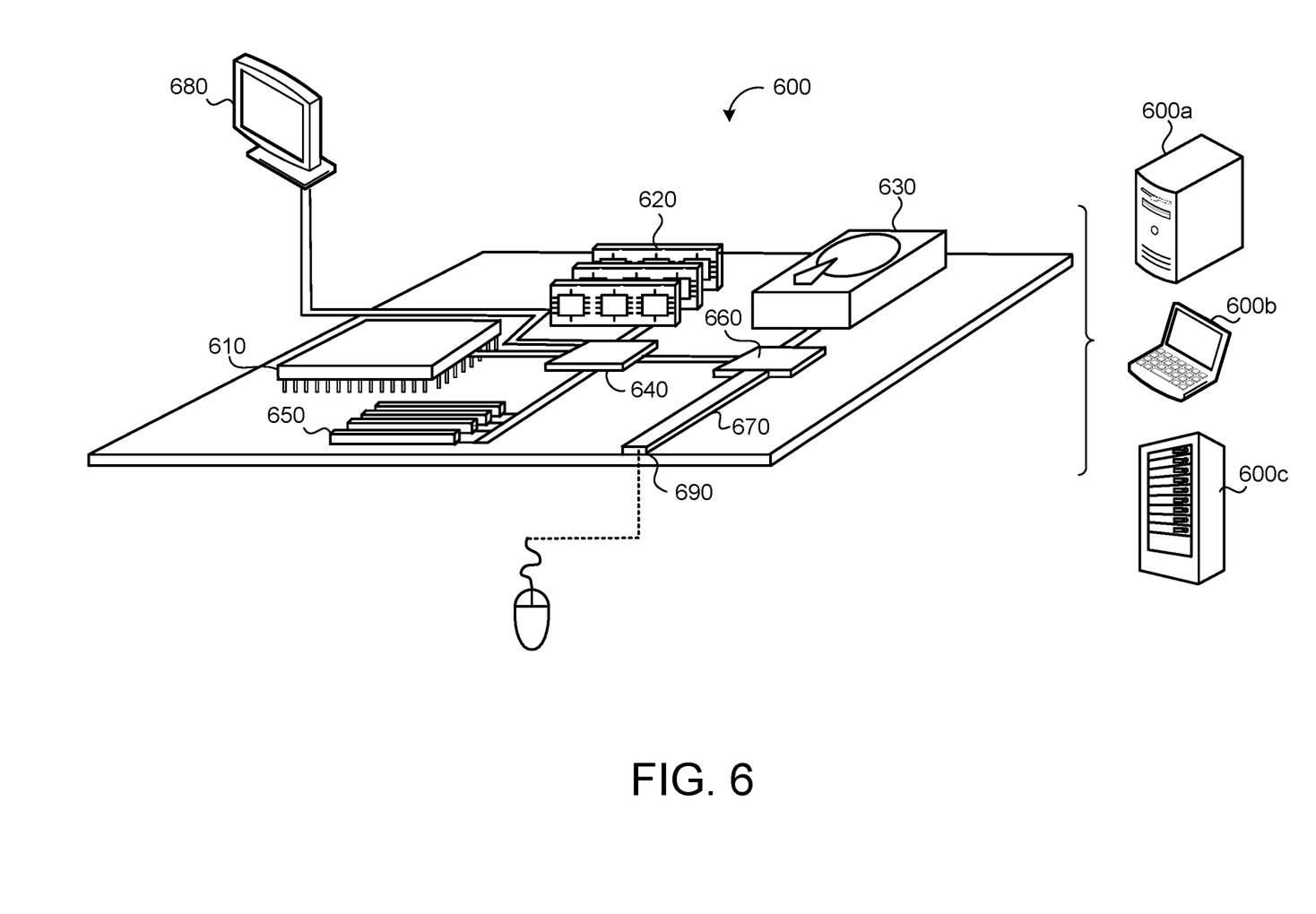
FIG. 6 is a schematic view of an example computing device that may be used to implement the systems and methods described herein.

FIG. 6 is schematic view of an example computing device 500 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the implementations described and/or claimed in this document.

The computing device 600 includes a processor 610 (e.g., data processing hardware 144), memory 620, a storage device 630, a high-speed interface/controller 540 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 (e.g., memory hardware 146) stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 500*a* or multiple times in a group of such servers 600*a*, as a laptop computer 600*b*, or as part of a rack server system 600*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:

executing a service enclave providing a first interface to a secure execution environment;

receiving, from a client device over a network, a program call via a second interface, the client device and the network external to the service enclave;

encrypting the program call, the encrypted program call comprising cipher text;

establishing a communication tunnel between the second interface and the first interface of the service enclave interfacing with the secure execution environment;

communicating the encrypted program call to the service enclave as encrypted communications through the communication tunnel;

attesting to a key manager external to the communication tunnel; and after successful attestation to the key manager, obtaining, at the service enclave, a decryption key from the key manager for decrypting the encrypted program call.

2. The method of claim 1, wherein the operations further comprise executing an enclave sandbox that wraps the service enclave.

3. The method of claim 2, wherein the enclave sandbox provides the second interface.

4. The method of claim 1, wherein the program call comprises cleartext.

5. The method of claim 4, wherein encrypting the program call comprises encrypting the cleartext as ciphertext using an encryption key.

6. The method of claim 5, wherein the operations further comprise decrypting the ciphertext back to the cleartext after successful attestation to the key manager.

7. The method of claim 6, wherein the operations further comprise, after encrypting the cleartext as ciphertext, storing the encryption key in the key manager, the encryption key associated with the decryption key for decrypting the ciphertext back to the cleartext.

8. The method of claim 1, wherein receiving the program call from the client device comprises receiving one of a get data call or a put data call from a client process interfacing with the second interface, the client process executing on the client device.

9. The method of claim 1, wherein receiving the program call from comprises receiving, via the first interface, a return data call from the service enclave, the return data call comprising a data object requested by the service enclave.

10. The method of claim 1, wherein the program call comprises a remote procedure call.

11. A system comprising:
    data processing hardware; and
    memory hardware in communication with the data processing hardware, the memory hardware storing instructions that when executed on the data processing hardware cause the data processing hardware to perform operations comprising:

executing a service enclave providing a first interface to a secure execution environment;

receiving, from a client device over a network, a program call via a second interface, the client device and the network external to the service enclave;

encrypting the program call, the encrypted program call comprising cipher text;

establishing a communication tunnel between the second interface and the first interface of the service enclave interfacing with the secure execution environment;

communicating the encrypted program call to the service enclave as encrypted communications through the communication tunnel;

attesting to a key manager external to the communication tunnel; and after successful attestation to the key manager, obtaining, at the service enclave a decryption key from the key manager for decrypting the encrypted program call.

12. The system of claim 11, wherein the operations further comprise executing an enclave sandbox that wraps the service enclave.

13. The system of claim 12, wherein the enclave sandbox provides the second interface.

14. The system of claim 11, wherein the program call comprises cleartext.

15. The system of claim 14, wherein encrypting the program call comprises encrypting the cleartext as ciphertext using an encryption key.

16. The system of claim 15, wherein the operations further comprise decrypting the ciphertext back to the cleartext after successful attestation to the key manager.

17. The system of claim 16, wherein the operations further comprise, after encrypting the cleartext as ciphertext, storing the encryption key in the key manager, the encryption key associated with the decryption key for decrypting the ciphertext back to the cleartext.

18. The system of claim 11, wherein receiving the program call from the client device comprises receiving one of a get data call or a put data call from a client process interfacing with the second interface, the client process executing on the client device.

19. The system of claim 11, wherein receiving the program call from comprises receiving, via the first interface, a return data call from the service enclave, the return data call comprising a data object requested by the service enclave.

20. The system of claim 11, wherein the program call comprises a remote procedure call.

* * * * *